United States Patent
Kwak et al.

(10) Patent No.: US 8,170,153 B2
(45) Date of Patent: May 1, 2012

(54) METHOD FOR DECIDING POSITION OF MAPPING SYMBOLS, AND DEVICE AND METHOD FOR MODULATING BINARY SIGNAL

(75) Inventors: Byung-Jae Kwak, Seoul (KR); Nah-Oak Song, Daejeon (KR); Dong-Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 474 days.

(21) Appl. No.: 12/518,951

(22) PCT Filed: Dec. 14, 2007

(86) PCT No.: PCT/KR2007/006558
§ 371 (c)(1),
(2), (4) Date: Jun. 12, 2009

(87) PCT Pub. No.: WO2008/072935
PCT Pub. Date: Jun. 19, 2008

(65) Prior Publication Data
US 2010/0014611 A1   Jan. 21, 2010

(30) Foreign Application Priority Data

Dec. 14, 2006   (KR) .................. 10-2006-0127639
Sep. 28, 2007   (KR) .................. 10-2007-0097881

(51) Int. Cl.
*H04L 27/06* (2006.01)
(52) U.S. Cl. ........ 375/340; 375/271; 375/279; 375/302; 375/308; 375/316; 375/322; 375/324; 375/329; 455/108; 455/324

(58) Field of Classification Search .............. 375/271, 375/279, 302, 308, 316, 322, 324, 329, 340; 455/108, 324
See application file for complete search history.

(56) References Cited

U.S. PATENT DOCUMENTS

| | | | |
|---|---|---|---|
| 4,660,213 A | 4/1987 | Holsinger et al. | |
| 5,471,508 A | 11/1995 | Koslov | |
| 5,832,041 A | 11/1998 | Hulyalkar | |
| 6,507,628 B1 | 1/2003 | McCallister et al. | |
| 7,006,578 B2 | 2/2006 | Walker et al. | |
| 7,039,126 B2 | 5/2006 | Galins | |
| 7,394,865 B2 * | 7/2008 | Borran et al. ............... | 375/295 |
| 2005/0249314 A1 | 11/2005 | Bock | |
| 2006/0018408 A1 * | 1/2006 | Bock et al. ................. | 375/322 |

FOREIGN PATENT DOCUMENTS

| | | |
|---|---|---|
| EP | 0571788 A2 | 12/1993 |
| KR | 1020050030602 | 3/2005 |
| WO | WO-2004/107768 A2 | 12/2004 |

* cited by examiner

*Primary Examiner* — Leon Flores
(74) *Attorney, Agent, or Firm* — Nelson Mullins Riley & Scarborough LLP; EuiHoon Lee, Esq.

(57) ABSTRACT

Disclosed is a binary signal modulator for minimizing deterioration of receiving performance caused by phase error. The binary signal modulator receives binary signals, and converts the binary signals into complex symbols according to a predetermined mapping relation. Here, the mapping relation is generated when a plurality of mapping symbols are arranged on a plurality of trajectories so that the distance between the mapping symbols is greater than or equal to a predetermined distance and the phase between the mapping symbols is greater than or equal to a predetermined angle from among the trajectories starting from a plurality of points on the complex plane, and a distance between the trajectories is greater than or equal to the minimum distance from among the distances between the points.

9 Claims, 12 Drawing Sheets

$d_{min} = 1$   $\Phi_{min} = 12°$

[Figure 1] Prior Art
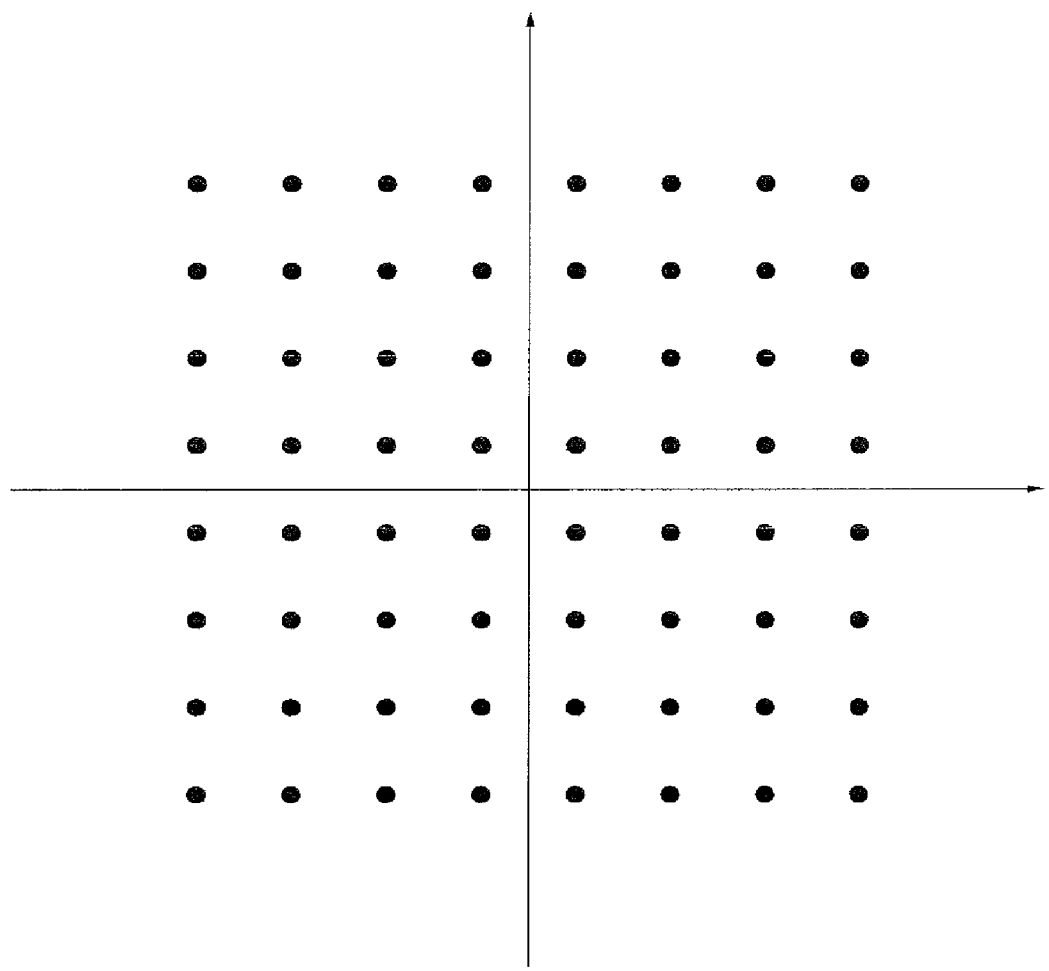

【Figure 2】 Prior Art
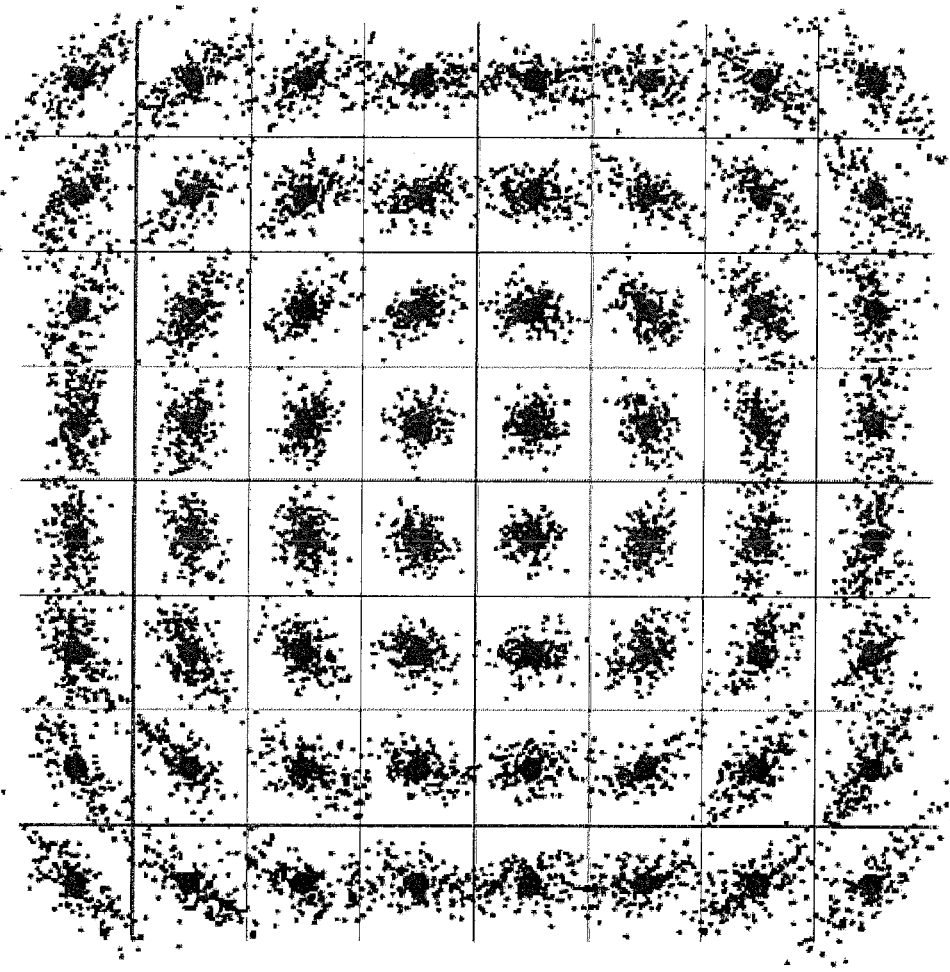
【Figure 3】
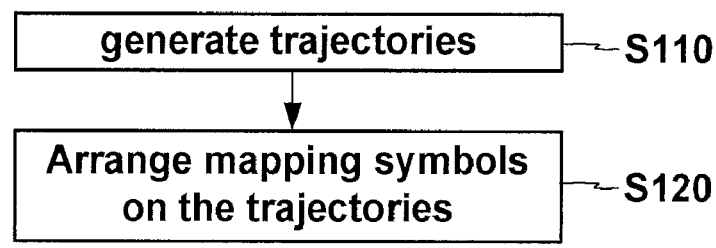

[Fig. 4]
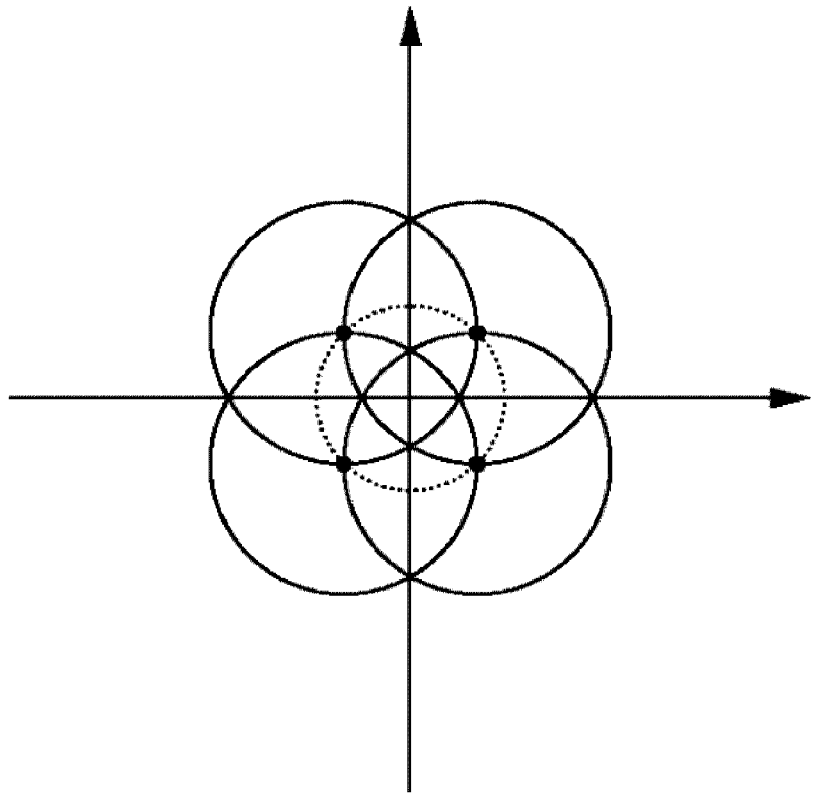
[Fig. 5]
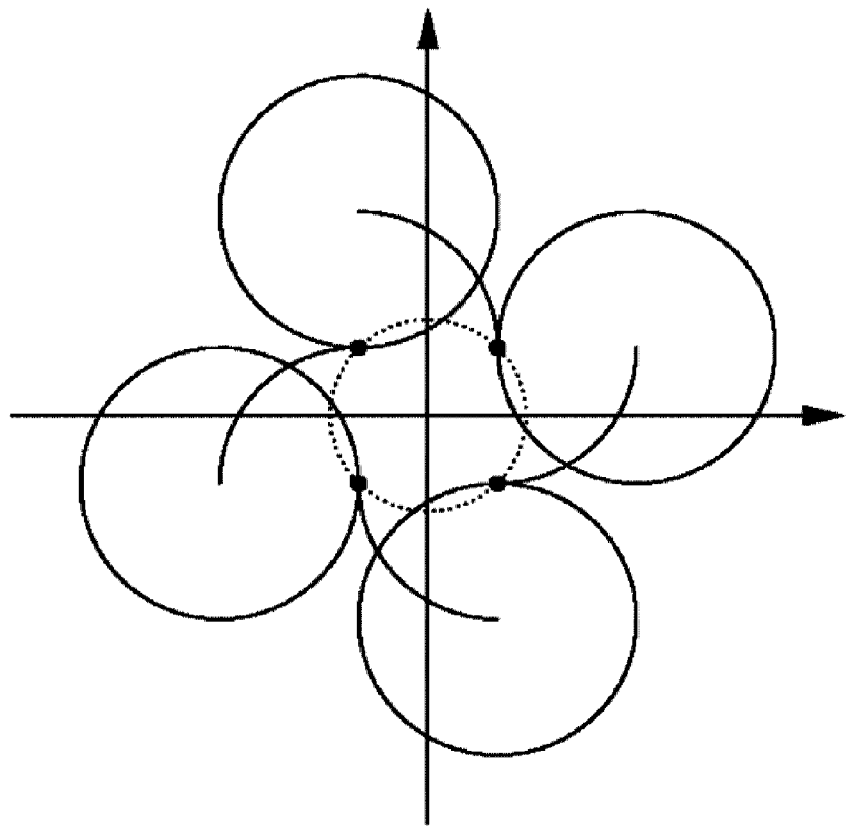

[Fig. 6]
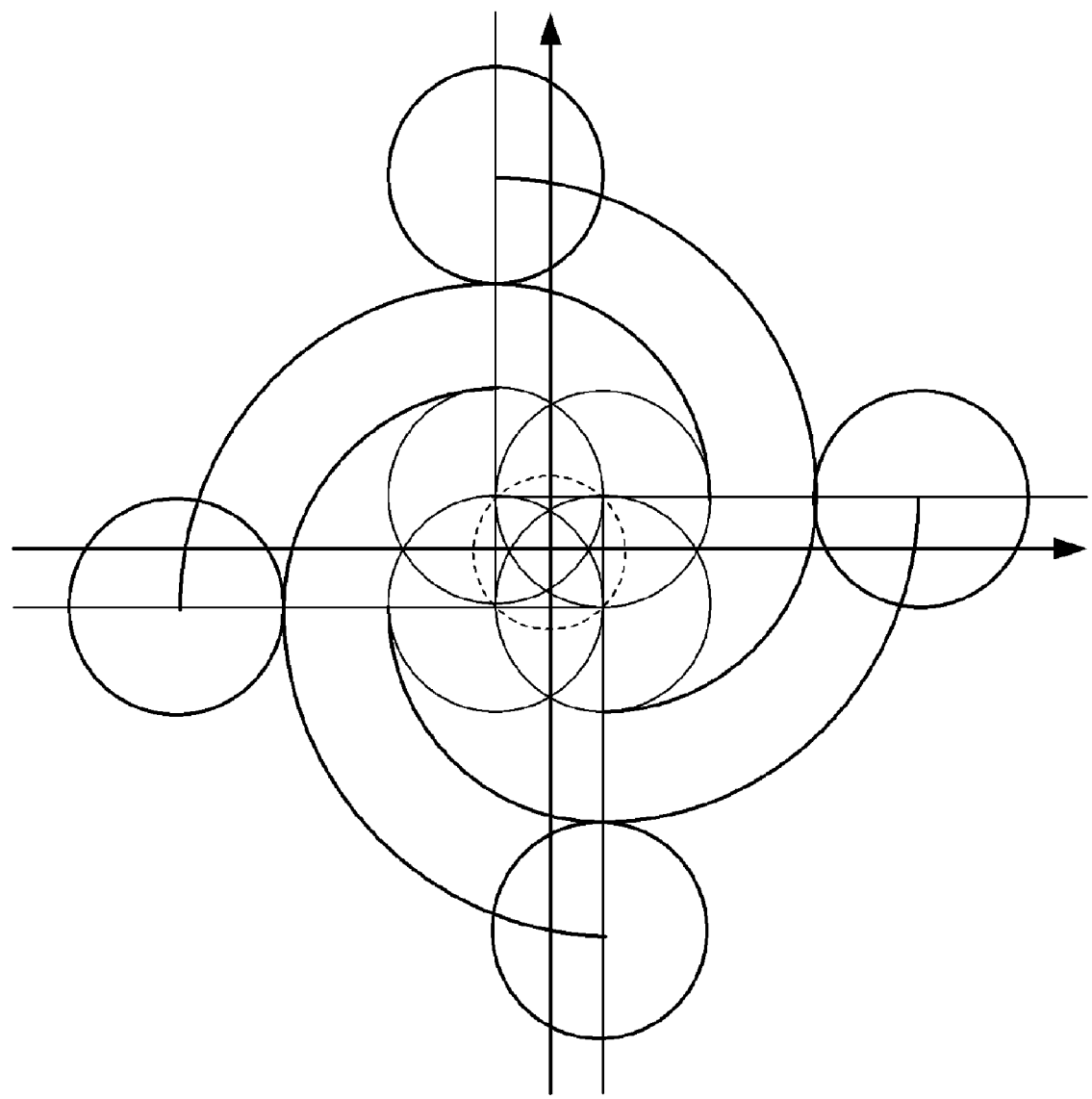

[Fig. 7]
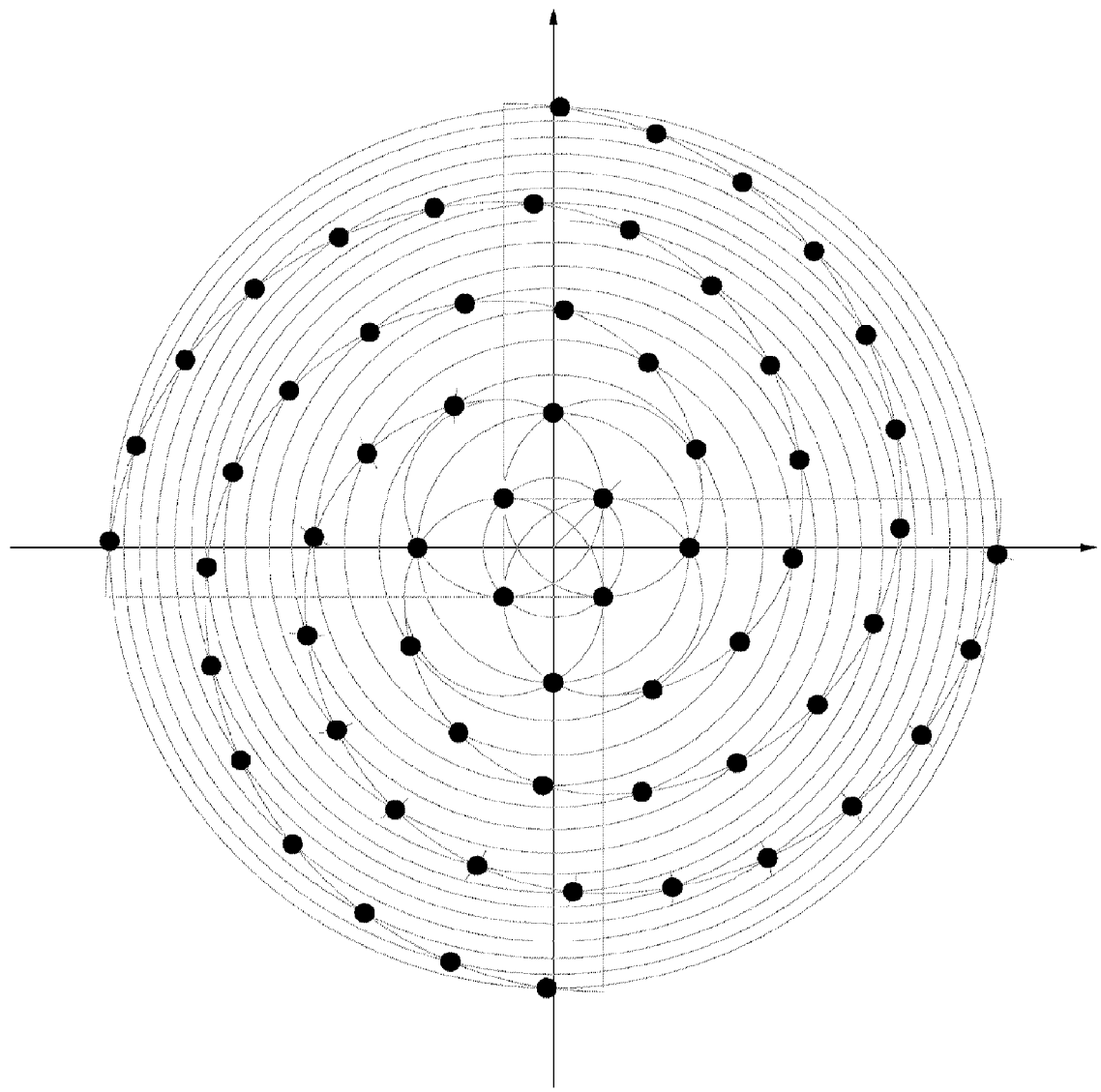
$d_{min} = 1$  $\Phi_{min} = 12°$

[Fig. 8]
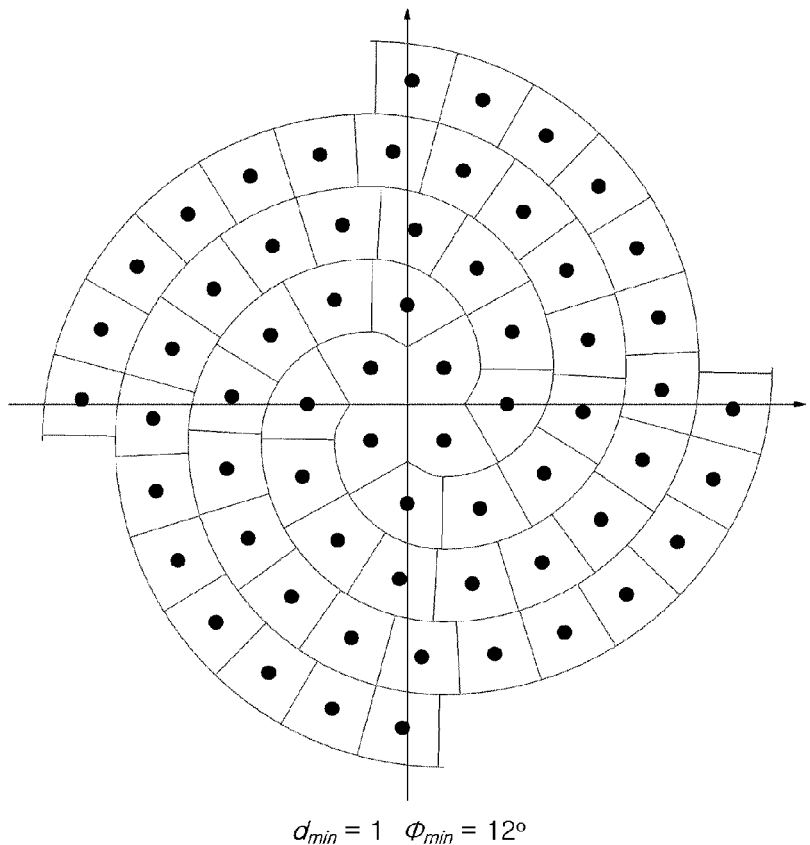
$d_{min} = 1 \quad \Phi_{min} = 12°$
[Fig. 9]
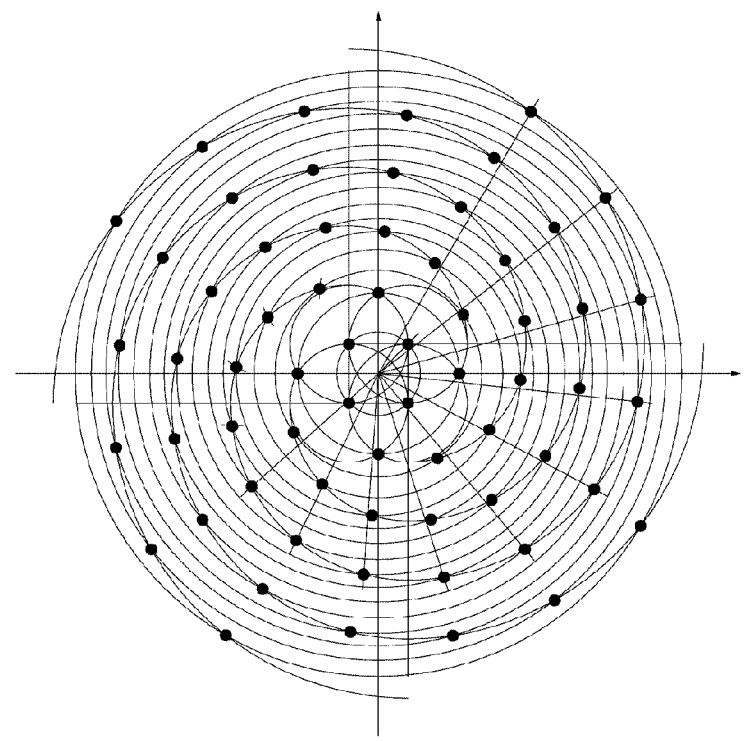
$d_{min} = 1 \quad \Phi_{min} = 22°$

[Fig. 10]
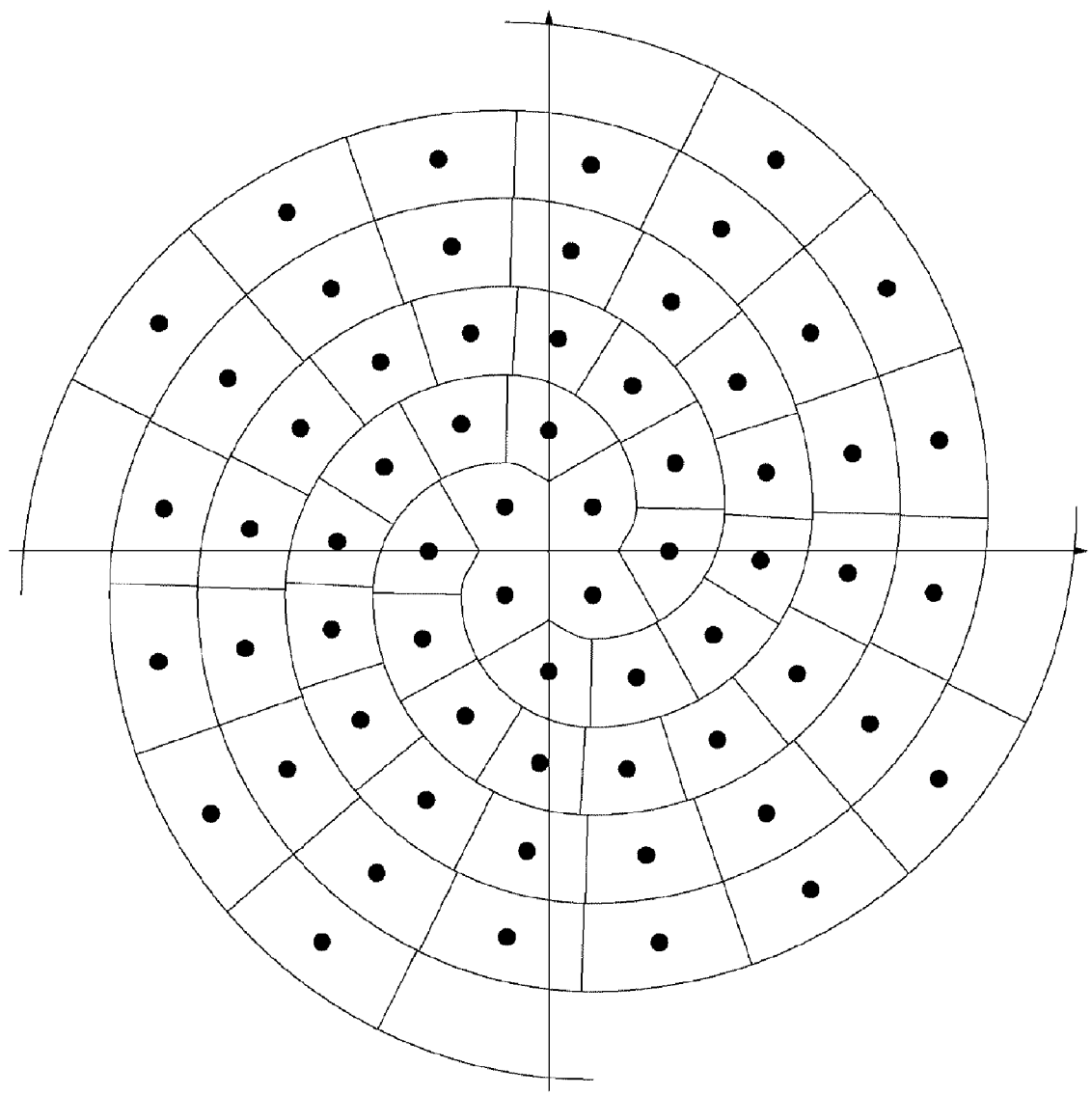
$d_{min} = 1$  $\Phi_{min} = 22°$

[Fig. 11]
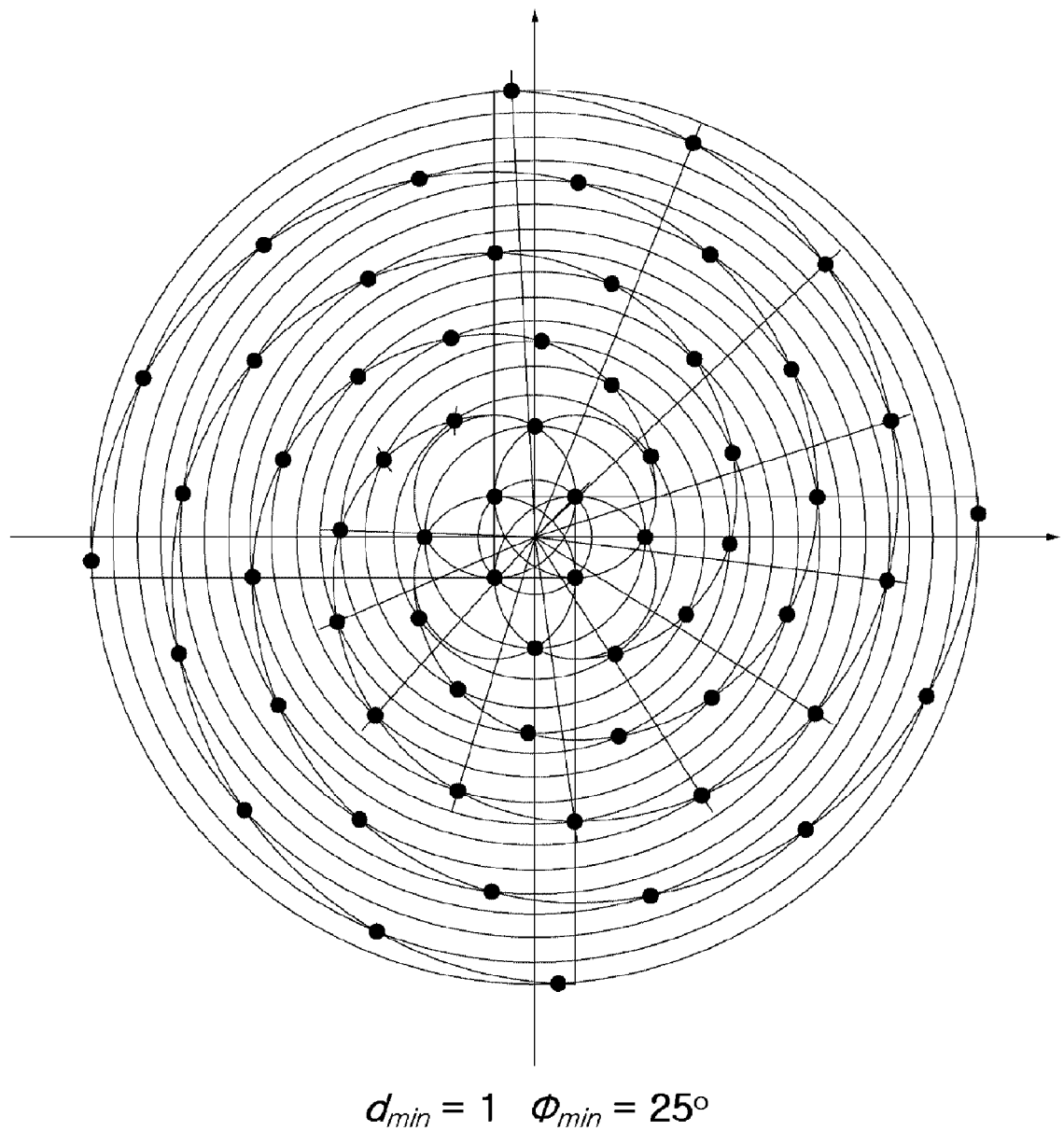
$d_{min} = 1$  $\Phi_{min} = 25°$

[Fig. 12]
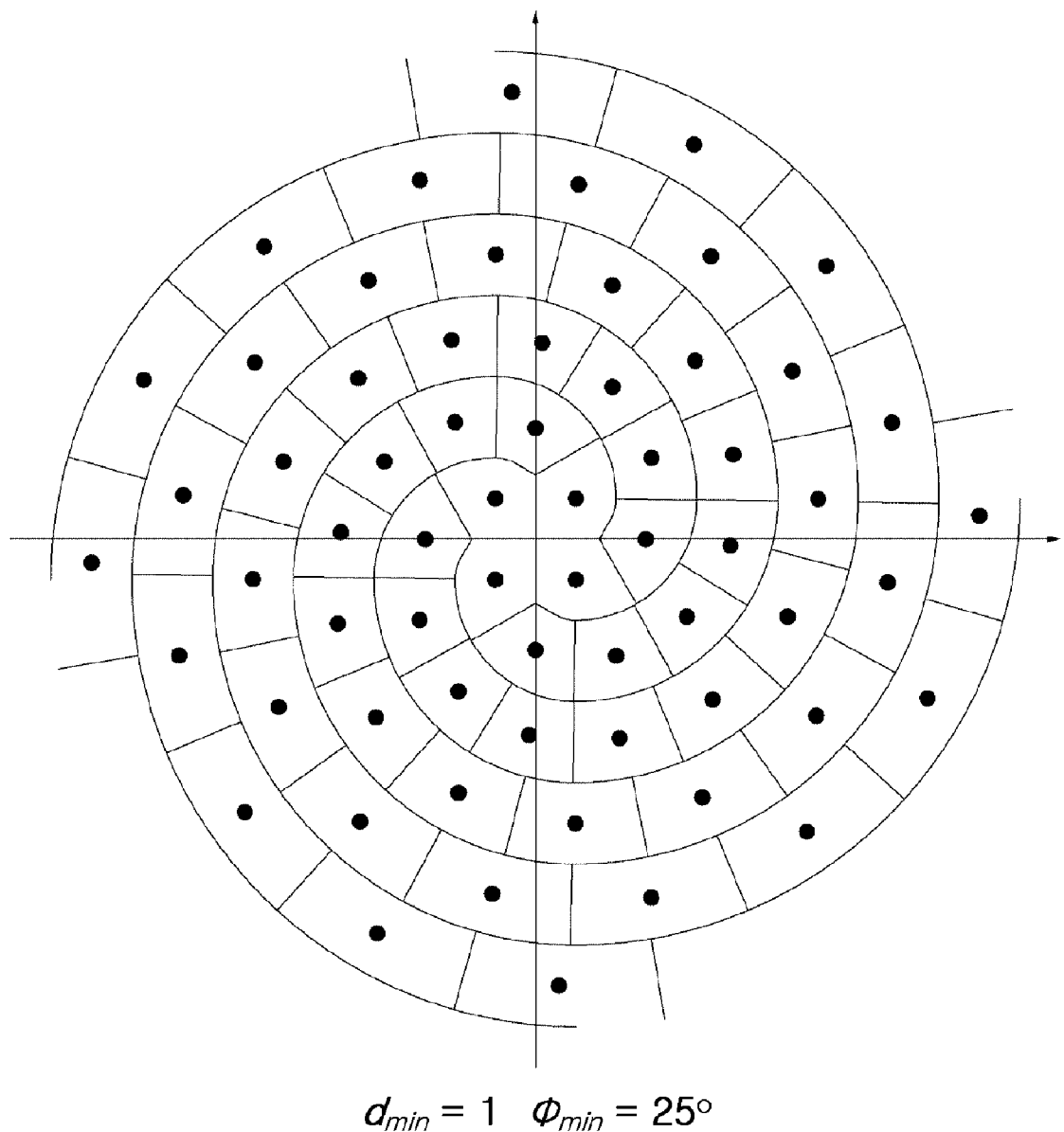
$d_{min} = 1 \quad \varPhi_{min} = 25°$

[Fig. 13]
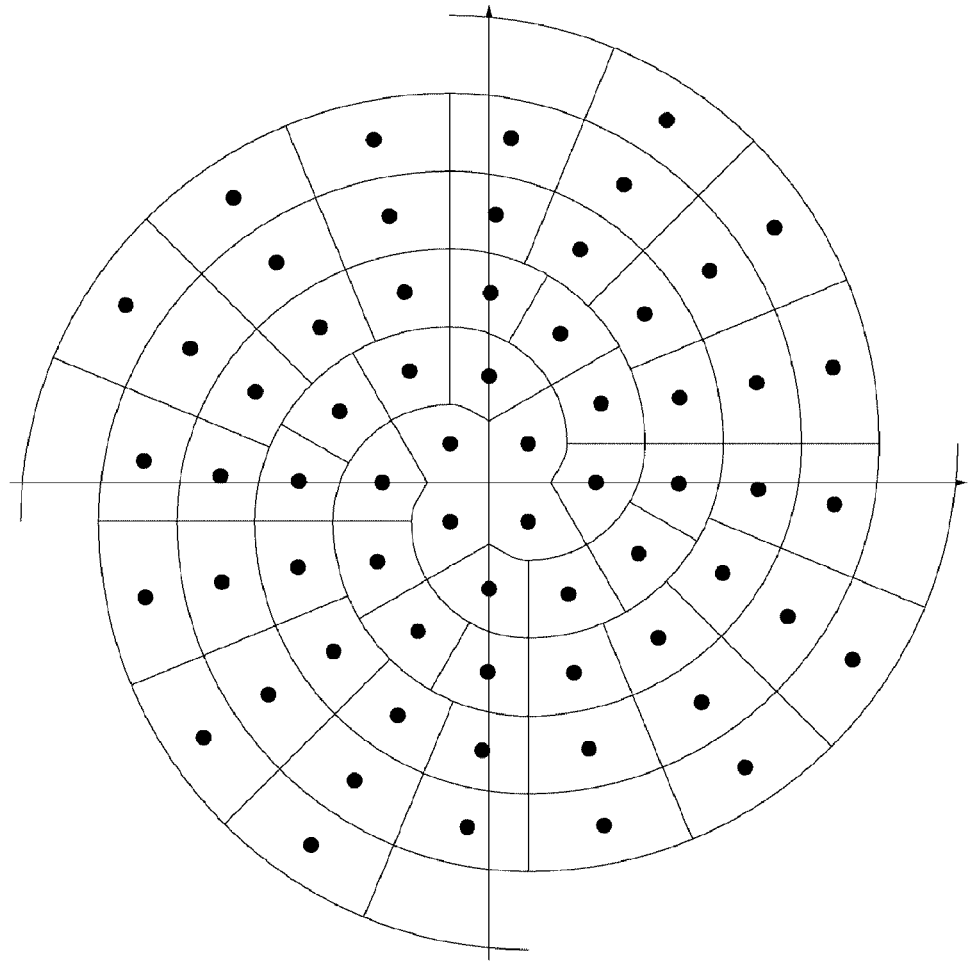
[Fig. 14]
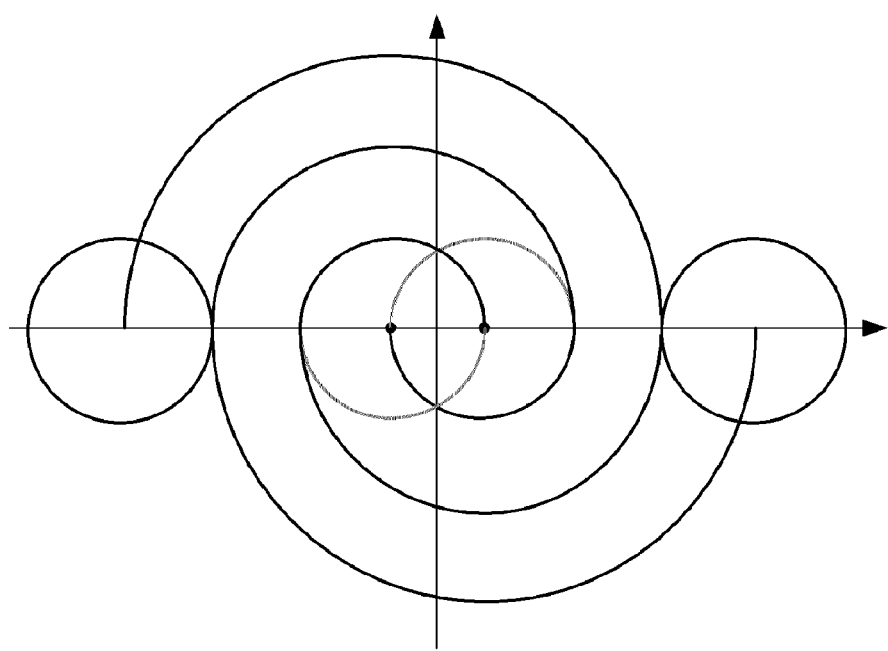

[Fig. 15]
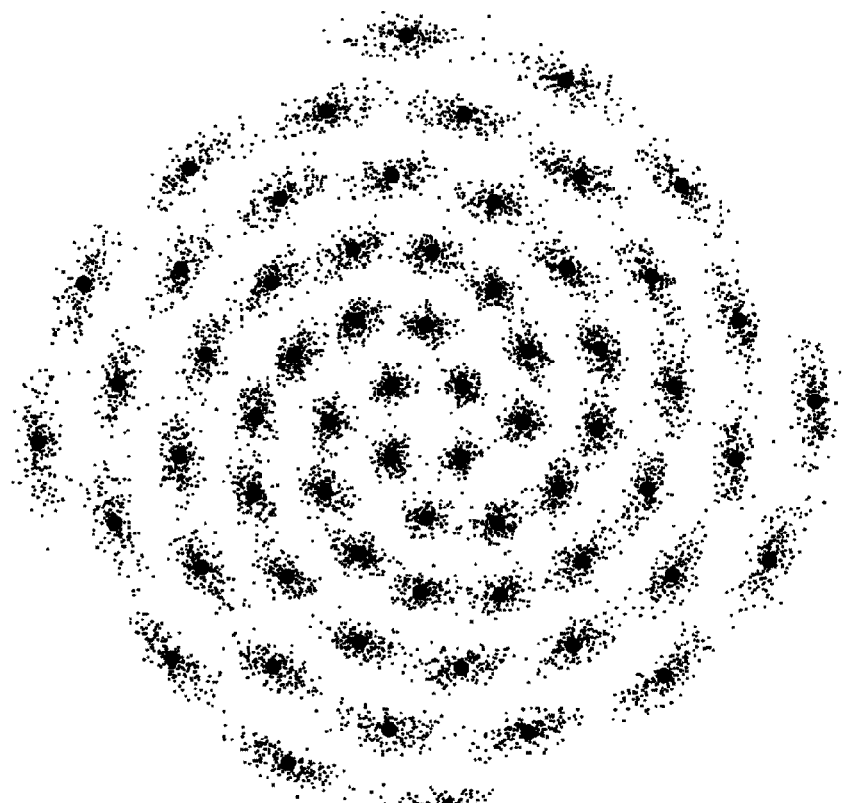
[Fig. 16]
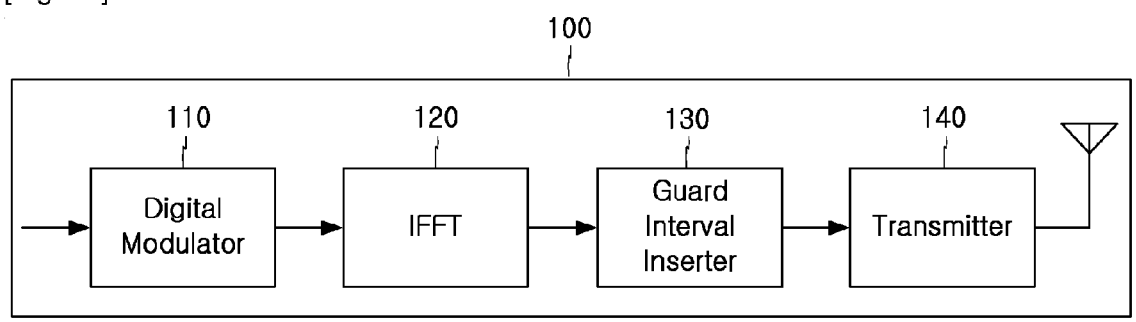

[Fig. 17]
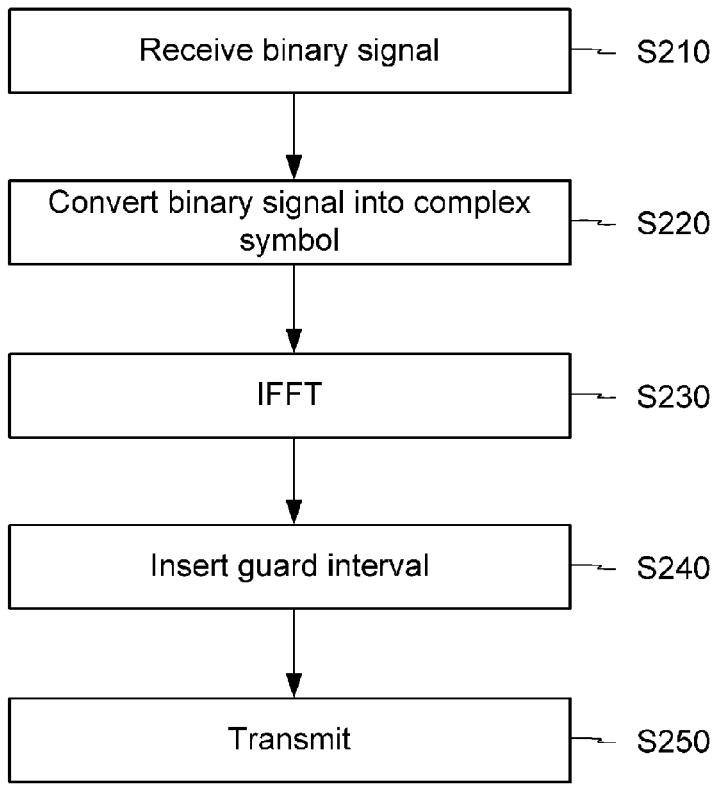
[Fig. 18]
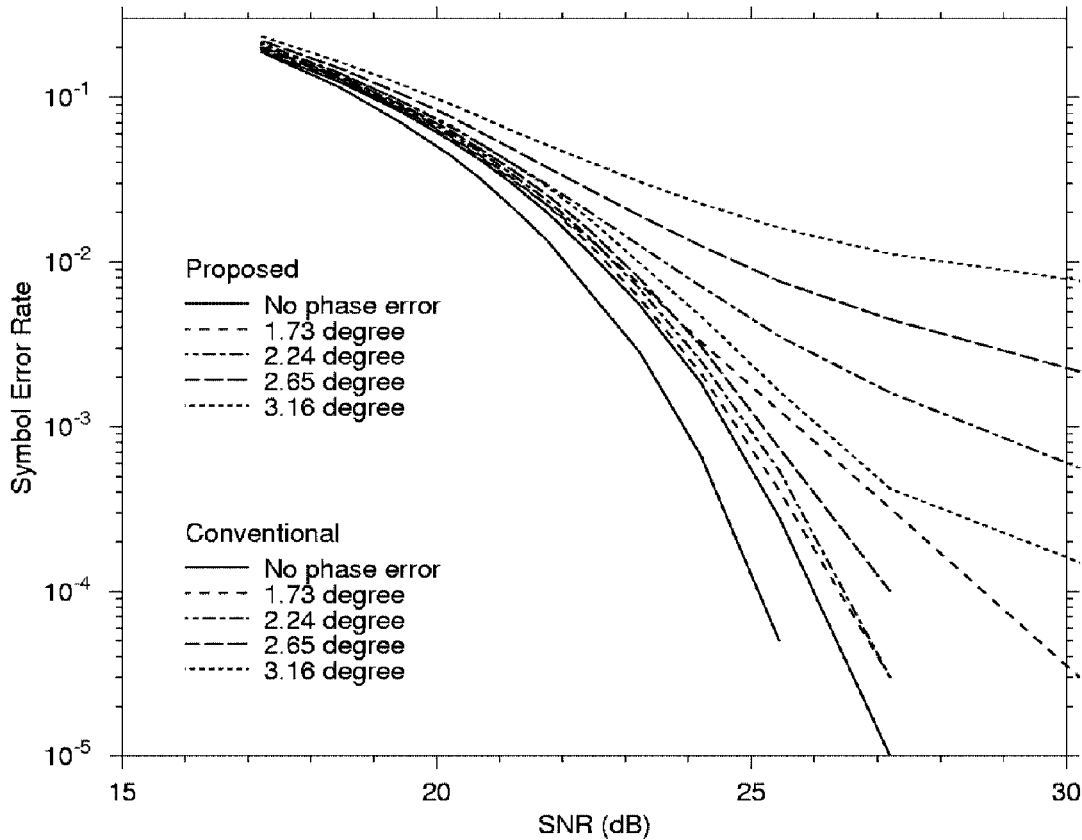

METHOD FOR DECIDING POSITION OF MAPPING SYMBOLS, AND DEVICE AND METHOD FOR MODULATING BINARY SIGNAL

RELATED APPLICATIONS

This application is a 35 U.S.C. §371 national stage filing of PCT Application No. PCT/KR2007/006558 filed on Dec. 14, 2007, which claims priority to, and the benefit of, Korean Patent Application No. 10-2006-0127639 filed on Dec. 14, 2006 and Korean Patent Application No. 10-2006-0097881 filed on Sep. 28, 2007. The contents of the aforementioned applications are hereby incorporated by reference.

TECHNICAL FIELD

The present invention relates to a method for modulating signals in a communication system. More particularly, the present invention relates to a method for configuring a constellation to minimize the influence on the performance for receiving phase error when a received signal has phase error because of a channel influence in the quadrature amplitude modulation (QAM) scheme for modulating transmission information into phase and amplitude values of a signal and transmitting the values.

BACKGROUND ART

Demands and requirements of users for wireless communication services have continually increased with the increased spread of mobile communication, and particularly, demands on various high speed multimedia services have been substantially increased. Accordingly, the importance of quality of service (QoS) of the communication service has been emphasized, and it is an essential function of the wireless communication system to support the QoS in the wireless communication service.

In comparison to a wired communication system, the wireless communication system imposes additional challenges due to the fact that the wireless channel is unreliable and its characteristics vary in time and by location. Cases of generating hostile wireless communication environments include the case in which a user moves fast during communication, the case in which a communication channel has a plurality of multi-paths other than the line of sight (LOS), and the case in which strong interference is provided by a neighboring system. When the channel environment is hostile as described, the receiver has a problem in the channel estimation, and phase error occurs during the channel estimation process to deteriorate the receiving performance of the system.

The phase error present in the received signal in the wireless communication can be generated by various reasons such as a fading channel caused by the Doppler effect or a multipath, or performance of a receiver that is not ideal.

Existing and future communication systems must allow high data rates and provide stable services under hostile channel environments. It is needed for the physical layer of the communication system to provide excellent link performance in order to allow stable high data rates in the wireless communication system. In order for the physical layer to provide excellent link performance, a transmitter must transmit the signal by using a modulation method having excellent performance, and a receiver must eliminate phase error and noise that are generated when the signal is passed through the radio communication channel by using an excellent synchronization algorithm and a channel estimation algorithm.

The orthogonal frequency division multiplexing (OFDM) scheme is a transmission method for providing excellent performance under a hostile channel environment, and is widely used in the wireless LAN and the WiMAX/WiBro systems since its performance is excellent in the condition in which the channel characteristic is determined by multi-paths (e.g., office or urban area) and its frequency usage efficiency is great. In order to increase the transmission efficiency in the OFDM system, a high-order modulation method such as the 64 QAM is used when the channel environment is good. However, when the channel environment is hostile, the symbol error rate is increased and the high-order modulation method such as the 64 QAM cannot be used. Here, even when the signal to noise ratio (SNR) is large, if a significant amount of phase error is present in the received signal, the symbol error rate is great so that a low-order modulation method such as the 16 QAM or the quadrature phase shift keying (QPSK) must be used.

To overcome the influence of the hostile channel environment, the receiver can use a synchronization algorithm or a channel estimation algorithm with excellent performance. However, it is limited for the receiver to remove the influence of the channel environment since the signal structure is determined by the transmitter. For example, when the channel environment is substantially changed as time is passed or when the length of a preamble or a pilot signal used for synchronization or channel estimation is not sufficiently long, the estimation of the channel fails to be valid within a short time or a synchronization or channel estimation error occurs, and the limitation of the receiver shows up as noise and phase error in the received signal. Since the receiver has a limit in overcoming the influence of the channel environment, it is required to transmit the signal so as to minimize the signal distortion by the phase error that is generated while the transmitter passes through the channel, in order to allow stable data transmission with a high data rate in the hostile channel environment.

Many communication systems use the high-order modulation method such as the 64 QAM so as to transmit data at a high data rate. FIG. 1 is a conventional 64 QAM constellation on the I-Q (in phase-quadrature) plane. Since 6 bits are required to express numbers of 64 cases, it is possible for the 64 QAM to transmit 6 bits by transmitting a symbol.

However, when the SNR of the received signal is low or the received signal has phase error, the transmitted symbol can be mistakenly determined to be an adjacent symbol and hence it is impossible to use the high-order modulation method such as the 64 QAM.

FIG. 2 is a received signal caused by the 64 QAM displayed on the I-Q plane when phase error and white noise are present. Referring to FIG. 2, the scattering of the received symbols without directivity from the original symbol location is the influence of the white noise, and the influence of the white noise to the received symbols is dominant in the symbols located close to the origin. On the other hand, in FIG. 2, the symbols that are distant from the origin for which the influence of the phase error is dominant are scattered to form an arc with reference to the origin, and the scattering degree is in proportion to the distance from the origin. As described above, the phase error applies more influence to the symbol that is far from the origin than the symbol that is near the origin differing from the white noise that applies the same influence to all the symbols. Therefore, when there is phase error, it is difficult to apply the high-order modulation method such as the 64 QAM for high-speed data transmission.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for determining the position of a mapping symbol to minimize deterioration of receiving performance caused by the phase error and a method for modulating a binary signal.

Technical Solution

In one aspect of the present invention, a method for determining positions of a plurality of mapping symbols for mapping binary signals on the complex plane includes: generating a plurality of trajectories respectively starting from a plurality of points on the complex plane, a distance between trajectories being greater than or equal to the minimum distance from among the distances between the points; and determining positions of a plurality of mapping symbols for mapping binary signals on the trajectories so that the distance between the mapping symbols at the respective trajectories is greater than or equal to a predetermined distance and a phase between the mapping symbols is greater than or equal to a predetermined angle.

The determining of positions of a plurality of mapping symbols includes determining phases of the mapping symbols so that the number of decision areas adjacent to the decision area to which the mapping symbol for determining the position belongs is minimized in the mapping symbols having a size greater than or equal to a predetermined value from among the plurality of mapping symbols.

The determining of positions of a plurality of mapping symbols further includes determining phases of the mapping symbols so that the bit difference between binary signals mapped on the adjacent mapping symbols is minimized.

In another aspect of the present invention, a method for modulating a binary signal includes receiving a binary signal, and converting the binary signal into a complex symbol according to a predetermined mapping relation.

The predetermined mapping relation is generated when a plurality of mapping symbols are arranged on a plurality of trajectories so that the distance between the mapping symbols is greater than or equal to a predetermined distance and the phase between the mapping symbols is greater than or equal to a predetermined angle from among the trajectories that respectively start from a plurality of points on the complex plane, a distance between the trajectories being greater than or equal to the minimum distance from among the distances between the points.

In another aspect of the present invention, a device for modulating a binary signal includes a digital modulator for converting the binary signal into a complex symbol according to a predetermined mapping, and an inverse Fourier transform unit for generating a plurality of samples by performing an inverse Fourier transform on the complex symbols.

The predetermined mapping relation is generated when a plurality of mapping symbols are arranged on a plurality of trajectories so that the distance between the mapping symbols is greater than or equal to a predetermined distance and the phase between the mapping symbols is greater than or equal to a predetermined angle from among the trajectories that respectively start from a plurality of points on the complex plane, a distance between the trajectories being greater than or equal to the minimum distance from among the distances between the points.

According to the exemplary embodiments of the present invention, receiving performance is increased and data transmission with a high data rate is allowed by configuring the constellation so as to minimize the symbol error rate when a received signal has phase error.

BRIEF DESCRIPTION OF THE DRAWINGS

FIG. 1 is a conventional 64 QAM constellation on the I-Q plane.

FIG. 2 is a received signal according to the conventional 64 QAM on the I-Q plane when there are phase error and white noise.

FIG. 3 is a flowchart for generating a constellation according to an exemplary embodiment of the present invention.

FIG. 4 shows 4 mapping symbols according to QPSK, and 4 circles having the shortest distance between symbols as the radius with reference to the mapping symbols on the complex plane.

FIG. 5 shows a process in which the 4 circles of FIG. 4 are evolving in the counter-clockwise direction according to an exemplary embodiment of the present invention.

FIG. 6 shows a process in which evolution of the 4 circles of FIG. 5 has proceeded further according to an exemplary embodiment of the present invention.

FIG. 7 is a constellation according to an exemplary embodiment of the present invention.

FIG. 8 is a decision boundary between mapping symbols in the constellation of FIG. 7.

FIG. 9 is a constellation according to a second exemplary embodiment of the present invention.

FIG. 10 is a decision boundary between symbols in the constellation of FIG. 9.

FIG. 11 is a constellation according to a third exemplary embodiment of the present invention.

FIG. 12 shows a decision boundary between symbols in the constellation of FIG. 11.

FIG. 13 is a constellation in which the decision boundary of mapping symbols is arranged according to an exemplary embodiment of the present invention.

FIG. 14 is trajectories of the centers of the evolving circles moving from the two symbols according to an exemplary embodiment of the present invention.

FIG. 15 shows a received signal on the I-Q plane caused by the 64 QAM according to an exemplary embodiment of the present invention when there are phase error and white noise.

FIG. 16 shows an OFDM transmitter according to an exemplary embodiment of the present invention.

FIG. 17 is a flowchart for an OFDM transmission method according to an exemplary embodiment of the present invention.

FIG. 18 is a graph for comparing the conventional 64 QAM performance and the 64 QAM performance according to an exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

Referring to FIG. 3 to FIG. 14, a method for forming a constellation according to an exemplary embodiment of the present invention will now be described.

FIG. 3 is a flowchart for generating a constellation according to an exemplary embodiment of the present invention.

In order to form the constellation according to an exemplary embodiment of the present invention, a plurality of trajectories starting from a plurality of points on the complex plane are illustrated (S110). Here, regarding the plurality of trajectories, the distance between the trajectories is set to be greater than or equal to the minimum distance from among the distances between the plurality of starting points. FIG. 4 to FIG. 6 show illustrations of the plurality of trajectories.

FIG. 4 shows 4 mapping symbols according to a quadrature phase shift keying (QPSK), and 4 circles having the shortest distance between symbols as the radius with reference to the mapping symbols on the complex plane.

In order to illustrate the plurality of trajectories for forming the constellation according to an exemplary embodiment of the present invention, starting points of the plurality of trajectories are set to be 4 mapping symbols, as shown in FIG. 4.

In FIG. 4, the 4 circles illustrated by the solid line have the QPSK mapping symbols as the centers and the minimum distance between the mapping symbols as a radius. The plurality of trajectories are generated by moving the 4 circles shown in FIG. 4 according to a predetermined rule and following the paths through which the centers of the moved circles are passed.

FIG. 5 shows a process in which the 4 circles of FIG. 4 are evolving in the counter-clockwise direction according to an exemplary embodiment of the present invention.

The 4 circles of FIG. 4 are moved according to the following rules A1, A2, and A3.

A1. When a circle moves, the trajectories of centers of other circles must not be in the circle.

A2. All the circles move in the clockwise or counterclockwise direction and the moving distances of all the circles are the same.

A3. When the circles move, the distances from the centers of the circles to the origin of the I-Q plane are kept to be the minimum.

When the circles are moved according to the rules from A1 to A3, 4 spiral trajectories of the centers of the circles are acquired, and in this instance, the distance between the trajectories is equal to or greater than the minimum distance between the mapping symbols.

FIG. 6 shows a process in which evolution of the 4 circles of FIG. 5 has proceeded further according to an exemplary embodiment of the present invention.

The 4 trajectories shown in FIG. 6 are generated by rotating the 4 circles of FIG. 4 in the counterclockwise direction by ¾ turns respectively.

FIG. 3 will now be described.

A constellation following the modulation method according to an exemplary embodiment of the present invention is acquired by determining the positions of a plurality of mapping symbols for mapping binary signals on a plurality of trajectories in step S120 so that the distance between the mapping symbols for the respective trajectories that are generated through the step of S110 becomes greater than or equal to a predetermined distance and the phase between the mapping symbols becomes greater than or equal to a predetermined angle.

The constellation according to the modulation according to the exemplary embodiment of the present invention is acquired by locating the mapping symbols on the spiral trajectories of FIG. 6. The rule for locating the mapping symbols on the spiral trajectories of FIG. 6 is as follows.

1. QPSK symbols are selected as the 4 initial mapping symbols.

2. The next 4 mapping symbols are located on the 4 spiral trajectories respectively. Here, the position of the next symbol is found to satisfy the conditions B1 and B2.

B1. The Euclidean distance between the two adjacent mapping symbols on the same spiral trajectory is greater than or equal to $d_{min}$.

B2. The angle generated by the two adjacent mapping symbols on the same spiral trajectory with reference to the origin is greater than or equal to $$\Phi_{min}.$$

3. The second step is repeated until the desired number of symbols are acquired.

FIG. 7 to FIG. 12 show constellations having 64 symbols for various values of $$\Phi_{min}$$

when the minimum distance between the QPSK mapping symbols is given as 1 and $d_{min}=1$. Particularly, the mapping symbols are arranged in the constellations shown in FIG. 7 to FIG. 12 so that the average energy per symbol is the minimum assuming that all the 64 symbols are equally probable to occur.

In further detail, FIG. 7 shows a constellation of 64 mapping symbols for $$\Phi_{min}=12°,$$

and FIG. 8 shows a decision boundary between mapping symbols in the constellation of FIG. 7. FIG. 9 shows a constellation of 64 mapping symbols for $$\Phi_{min}=22°,$$

and FIG. 10 shows a decision boundary between symbols in the constellation of FIG. 9. FIG. 11 shows a constellation of 64 mapping symbols for $$\Phi_{min}=25°,$$

and FIG. 12 shows a decision boundary between symbols in the constellation of FIG. 11.

The modulation method according to the exemplary embodiment of the present invention is very efficient in terms of transmission power. As can be known from Table 1, when it is given that $$\Phi_{min}=12°,$$

the average energy $E_s$ per symbol of the 64 QAM according to the exemplary embodiment of the present invention is less than that of the conventional 64 QAM, which shows that the symbol configuration in the constellation according to the exemplary embodiment of the present invention is very efficient in terms of transmission power. The existing 64 QAM and the 64 QAM according to the exemplary embodiment of the present invention for $$\Phi_{min}=12°,$$

generate similar performance under the white noise (AWGN) channel environment and when the received signal has phase error.

TABLE 1

|  | 64 QAM for embodiment of present invention | | |
| --- | --- | --- | --- |
| Existing 64 QAM | $\Phi_{min} = 12°$ | $\Phi_{min} = 22°$ | $\Phi_{min} = 25°$ |
| $E_s$ 10.50 (10.21 dB) | 10.18 (10.08 dB) | 11.78 (10.71 dB) | 13.04 (11.15 dB) |

$E_s = \Sigma |s_i|/d_{min}$, dB = 10log(·)

As the value of $$\Phi_{min}$$

is increased, resistance against the phase error is increased. For example, in the case of $$\Phi_{min}=22°$$

of FIG. 9 and $$\Phi_{min}=25°$$

of FIG. 11, the angle between the symbols, distant from the origin, with reference to the origin is greater than that of the case of $$\Phi_{min}=12°,$$

and resultantly, the resistance against the phase error becomes greater.

As shown in FIG. 7, FIG. 9, and FIG. 11, regarding the 64 QAM according to the exemplary embodiment of the present invention, the constellation is configured so as to minimize the average energy per symbol. In detail, the constellation is configured so that either the Euclidean distance between the two adjacent symbols is $d_{min}$ or the angle between the two adjacent symbols with reference to the origin is $$\Phi_{min}.$$

However, in this case, the decision boundary of the symbols is irregular and is not very well aligned as shown in FIG. 8, FIG. 10, and FIG. 12. The performance of transmitting/receiving signals through the communication system is greatly influenced not only by the configuration of the QAM constellation but also by the one-to-one mapping of the binary code sequence to the QAM symbols. For example, regarding the gray code, the binary code sequences mapped to two adjacent symbols are differ by only a single bit so that a symbol error may result in only one bit error. When the decision boundaries of the symbols are irregular and are not very well aligned, it may be difficult to find the symbol mapping that has a similar characteristic as that of the gray code and minimizes the bit error rate (BER) and it may make implementation of the detector complicated.

In the configuration of the constellation according to the embodiment of the present invention, the decision boundaries of the mapping symbols can be aligned by determining the positions of the mapping symbols so that the Euclidean distance between the adjacent mapping symbols is greater than $d_{min}$ or the angle with reference to the origin is greater than $$\Phi_{min},$$

other than determining the per-symbol average energy to be the minimum. FIG. 13 shows the constellation configured according to the above-described method. FIG. 13 has a similar constellation configuration as FIG. 10 but has a better aligned decision boundaries of symbols compared to FIG. 10.

Particularly, regarding the mapping symbol that has an absolute value that is greater than or equal to a predetermined value, it is possible to align the decision boundaries by determining the position of the mapping symbols so that the number of decision areas that are neighboring with a decision area of the symbol may be the minimum (4 in FIG. 13). Through this process, we can minimize the number of bit differences between the binary code sequences that are mapped to two adjacent symbols, as it is the case with the gray code.

The high-order QAM modulation method according to the exemplary embodiment of the present invention starting from the QPSK mapping symbol has been realized. However, there is no need to restrict the number of starting symbols to be 4 in the constellation configuration method. For example, FIG. 14 shows the trajectories of the centers of the circles moving from the two symbols according to an exemplary embodiment of the present invention. Here, the two mapping symbols can be binary phase shift keying (BPSK) mapping symbols. Also, the number of starting symbols can be 3 or 5 so as to configure the constellation according to the exemplary embodiment of the present invention. The plurality of starting symbols can be configured with the symbols on the circle with the origin as the center. The embodiment of the present invention is applicable to the case in which the number of starting symbols is not 4, and it is also possible to configure the constellation by determining the positions of the symbols on the trajectories that are generated when the centers of the circles move along in a like manner of the case of 4 starting symbols so that the conditions B1 and B2 are satisfied.

FIG. 15 shows a received signal on the I-Q plane caused by the 64 QAM according to an exemplary embodiment of the present invention when there are phase error and white noise. Particularly, FIG. 15 shows a received signal having white noise and phase error in the communication system using the constellation when $d_{min}=1$ and $$\Phi_{min}=25°.$$

In the case of the symbols that are distant from the origin in the constellation shown in FIG. 15, the adjacent symbols are well separated from each other compared to the case of FIG. 3. Hence, even when the received signal that is distant from the origin contains large phase error, there is less probability of entering the adjacent decision boundary and hence the receiving performance is increased because the influence of the phase error is minimized in the constellation configuring stage. When the value of $$\Phi_{min}$$

that is less than that of FIG. 15 is used, the symbol density of the constellation is larger, and hence, the receiver will be more resistant against AWGN, but the receiver will also be more sensitive to the phase error in the case of the same SNR. On the other hand, when the value of $$\Phi_{min}$$

that is greater than that of FIG. 15 is used, the receiver will be less resistant against AWGN, but the receiver will be less sensitive to the phase error in the case of the same SNR.

Therefore, when the characteristic of the received signal is dominated by the phase error rather than the noise, excellent performance can be obtained by using the modulation method having a large value of $\Phi_{min}$ according to the embodiment of the present invention compared to the existing QAM based method.

Referring to FIG. 16 and FIG. 17, an OFDM transmitter 100 according to an exemplary embodiment of the present invention will be described.

FIG. 16 shows an OFDM transmitter according to an exemplary embodiment of the present invention.

As shown in FIG. 16, the OFDM transmitter 100 includes a digital modulator 110, an inverse fast Fourier transformer (IFFT) unit 120, a guard interval inserter 130, and a transmitter 140.

FIG. 17 is a flowchart for an OFDM transmission method according to an exemplary embodiment of the present invention.

The digital modulator 110 receives a binary signal from an upper layer (S210).

The digital modulator 110 maps and converts the received binary signal into a complex symbol according to the mapping relation of the constellation according to the exemplary embodiment of the present invention (S220).

The IFFT unit 120 performs an IFFT process on a plurality of complex symbols output by the digital modulator 110 to generate a plurality of samples corresponding to the OFDM symbols (S230).

The guard interval inserter 130 inserts a guard interval such as a cyclic prefix (CP) into a plurality of samples output by the IFFT unit 120 (S240), and the transmitter 140 converts the guard interval inserted samples output by the guard interval inserter 130 into analog signals, converts the analog signals into radio frequency (RF) signals, and transmits the RF signals to a channel through the antenna (S250).

It has been described in FIG. 16 and FIG. 17 that the mapping relation of the constellation according to the exemplary embodiment of the present invention is applied to the OFDM system, and the same is also applicable to various transmission systems such as the single carrier system. That is, the IFFT unit 120 and the guard interval inserter 130 can be omitted in FIG. 16.

FIG. 18 is a graph for comparing the conventional 64 QAM performance and the 64 QAM performance according to the exemplary embodiment of the present invention. Referring to FIG. 18, the symbol error rates (SER) of the conventional 64 QAM and the 64 QAM according to the exemplary embodiment of the present invention are compared for various white noise and phase error values, and the angle represents the standard deviation of the random phase error.

As shown in FIG. 18, when there is no phase error, that is, when there is white noise, the existing 64 QAM has slightly better performance. However, when the received signal has phase error, the existing 64 QAM does not substantially reduce the SER when the SNR is increased, but the slope of the performance curve for the 64 QAM according to the exemplary embodiment of the present invention remains very steep and yields low symbol error rate even when the SNR is small and there is a significant amount of phase error.

The exemplary embodiments of the present invention have been mainly described for a wireless communication system; however, the present invention is also applicable to a wired communication system, the performance of which is influenced by phase error. Also, the 64 QAM has been used for the signal's modulation in the exemplary embodiments of the present invention, but the present invention is also applicable to QAM of other modulation orders different from that of 64 QAM.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for determining positions of a plurality of mapping symbols for mapping binary signals on the complex plane, the method comprising:

generating a plurality of trajectories respectively starting from a plurality of points on the complex plane, a distance between the trajectories being greater than or equal to the minimum distance from among the distances between the points; and determining positions of the plurality of mapping symbols for mapping binary signals on the trajectories so that the distance between the mapping symbols at each of the trajectories is greater than or equal to a predetermined distance and a phase between the mapping symbols is greater than or equal to a predetermined angle, wherein the determining of positions of the plurality of mapping symbols comprises:

determining phases of the mapping symbols so that the number of decision areas adjacent to the decision area to which the mapping symbol for determining the position belongs is minimized in the mapping symbols having a size greater than or equal to a predetermined value from among the plurality of mapping symbols.

2. The method of claim 1, wherein the determining of positions of the plurality of mapping symbols further comprises:

determining phases of the mapping symbols so that the bit difference between binary signals mapped on the adjacent mapping symbols is minimized.

3. A method for modulating a binary signal comprising:

receiving a binary signal; and converting the binary signal into a complex symbol according to a predetermined mapping relation, wherein the predetermined mapping relation is generated by arranging a plurality of mapping symbols on a plurality of trajectories so that the distance between the mapping symbols is greater than or equal to a predetermined distance and the phase between the mapping symbols is greater than or equal to a predetermined angle, wherein the plurality of trajectories respectively start from a plurality of points on the complex plane, wherein a distance between the plurality of trajectories is greater than or equal to the minimum distance from among the distances between the points, wherein the predetermined mapping relation is generated by arranging the plurality of mapping symbols so that the number of decision areas adjacent to the decision area to which the mapping symbol for determining the position is minimized in the mapping symbols having a size greater than or equal to a predetermined value from among the mapping symbols.

4. The method of claim 3, wherein the predetermined mapping relation is generated by arranging the mapping symbols so that the bit difference between the binary signals mapped on the adjacent mapping symbols is minimized.

5. The method of claim 4, wherein the plurality of points correspond to a plurality of quadrature phase shift keying mapping symbols.

6. The method of claim 4, wherein the plurality of points correspond to a plurality of binary phase shift keying mapping symbols.

7. The method of claim 6, further comprising:
generating a plurality of samples by performing an inverse Fourier transform with the complex symbols; and
converting the plurality of samples into analog signals.

8. A device for modulating a binary signal comprising:
a digital modulator for converting the binary signal into a complex symbol according to a predetermined mapping; and
an inverse Fourier transform unit for generating a plurality of samples by performing an inverse Fourier transform with the complex symbols,
wherein the predetermined mapping relation is generated by arranging a plurality of mapping symbols on a plurality of trajectories so that the distance between the mapping symbols is greater than or equal to a predetermined distance and the phase between the mapping symbols is greater than or equal to a predetermined angle
wherein the plurality of trajectories respectively start from a plurality of points on the complex plane,
wherein a distance between the plurality of trajectories is greater than or equal to the minimum distance from among the distances between the points,
wherein the predetermined mapping relation is generated by arranging the plurality of mapping symbols so that the number of decision areas adjacent to the decision area to which the mapping symbol for determining the position is minimized in the mapping symbols having a size greater than or equal to a predetermined value from among the mapping symbols, and
the predetermined mapping relation is generated by arranging the mapping symbols so that the bit difference between the binary signals mapped on the adjacent mapping symbols is minimized.

9. The device of claim 8, further comprising:
a guard interval inserter for inserting a guard interval into the samples; and
a transmitter for converting the guard interval inserted samples into an analog signal and transmitting the analog signal through an antenna.

* * * * *